(12) United States Patent
Vecchione et al.

(10) Patent No.: US 8,778,561 B2
(45) Date of Patent: Jul. 15, 2014

(54) ELECTROCATALYTIC POLYMER-BASED POWDER, METHOD OF PRODUCTION AND USE THEREOF

(75) Inventors: Raffaele Vecchione, Naples (IT); Giuseppe Mensitieri, Naples (IT); Anna Borriello, Portici (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 813 days.

(21) Appl. No.: 12/363,985

(22) Filed: Feb. 2, 2009

(65) Prior Publication Data

US 2009/0196984 A1 Aug. 6, 2009

(30) Foreign Application Priority Data

Feb. 4, 2008 (IT) .............................. MI2008A0168

(51) Int. Cl.
*H01M 2/14* (2006.01)

(52) U.S. Cl.
USPC ........... 429/509; 429/474; 429/480; 429/520; 429/524; 429/526; 429/527; 429/528; 429/529; 429/532

(58) Field of Classification Search
USPC ......... 429/509, 474, 480, 520, 524, 526, 527, 429/528, 529, 532
See application file for complete search history.

(56) References Cited

U.S. PATENT DOCUMENTS

| | | | |
|---|---|---|---|
| 2004/0102577 A1* | 5/2004 | Hsu et al. ...................... | 525/182 |
| 2006/0134506 A1* | 6/2006 | Kim et al. ........................ | 429/44 |
| 2007/0034836 A1* | 2/2007 | Epstein et al. ................ | 252/500 |
| 2007/0060471 A1* | 3/2007 | Zhou et al. .................... | 502/101 |

\* cited by examiner

*Primary Examiner* — Shane Fang
(74) *Attorney, Agent, or Firm* — Allen, Dyer, Doppelt, Milbrath & Gilchrist, P.A.

(57) ABSTRACT

An electrocatalytic polymer-based powder has particles of at least one electronically conductive polymer species in which particles are dispersed of at least one catalytic redox species, in which the particles of the polymer species and of the catalytic species are of nanometric dimension.

21 Claims, 1 Drawing Sheet

100 nm

ELECTROCATALYTIC POLYMER-BASED POWDER, METHOD OF PRODUCTION AND USE THEREOF

FIELD OF THE INVENTION

The invention refers to an electrocatalytic polymer-based powder and, in particular, to an electronically conductive polymer-based powder that may be used in the electrodes of polymer membrane fuel cells. The invention also refers to a method of production of the aforesaid electrocatalytic polymer-based powder.

BACKGROUND OF THE INVENTION

A fuel cell is a power source that converts chemical energy into electrical energy by exploiting the oxidation of a fuel. The fuel, generally hydrogen or methanol, is contained in a cartridge that can be substituted in a few seconds.

PEMFCs are particular types of fuel cells (Polymer Electrolyte Membrane Fuel Cell) that function at low temperatures and which therefore are well suited for a quickly growing market like that of portable applications.

The functioning of a PEMFC is essentially assured by two electrodes, anode and cathode, where the electrochemical reactions take place that generate electrical energy, and by an electrolyte which transports the ions from the anode to the cathode, which in the specific case comprising the aforesaid polymer membrane.

In the case of hydrogen fuel cells, the reactions involved are:

$$H_2 \rightarrow 2H^+ + 2e^- \text{ (anode)}$$

$$\tfrac{1}{2}O_2 + 2e^- + 2H^+ \rightarrow H_2O \text{ (cathode)}$$

while in the case of direct methanol fuel cells, the following reactions take place:

$$CH_3OH + H_2O \rightarrow 6e^- + 6H^+ + CO_2 \text{ (anode)}$$

$$3/2 O_2 + 6e^- + 6H^+ \rightarrow 3H_2O \text{ (cathode)}$$

FIG. 1 shows a typical diagram of the assembly comprising the electrodes and the polymer electrolyte membrane of a PEMFC, commonly defined MEA or "Membrane Electrode Assembly."

Such a polymer electrolyte membrane, or polyelectrolyte membrane, is positioned between the electrodes of the cell and has the function of electronically isolating the anode and cathode, allowing however the protons developed in the anode to pass through.

In turn, the electrons developed at the anode are provided to an external load, to then be consumed together with the protons once they have reached the cathode.

An electrode is typically formed by a catalytic layer where the related electrochemical reaction is triggered, and by a diffusive layer which supports the catalytic layer and which acts as a collector of the electrons participating in the electrode reactions in addition to acting as a diffuser of the chemical reagents, that is, as a diffuser of the fuel and oxygen that participate in the aforesaid reactions.

The catalytic layer may therefore favor the transport of the reagents, the ionic one (proton) and the electronic one, which occurs in respective so-called porous phase, electrolyte phase or proton transport phase, and electronically conductive phase or electron transport phase, the latter being the phase that supports the catalyst.

The catalytic layer may therefore also favor the simultaneous contact between the aforesaid three phases. Regarding the catalyst, it should be added that it may advantageously have a good efficiency, i.e. the catalyst may have a high dispersion coefficient, which is defined as the ratio between the number of surface atoms and the total number of atoms.

The higher the ratio, the more efficiently the catalyst is used, since the surface area on which the electrochemical reactions can take place is greater. A known process for making the catalytic layer involves the deposition of a catalyst ink comprising a proton transport polymer phase, a catalyst supported by electronically conductive particles, and possibly pore-forming agents for the creation of porosity, in addition to additives of a binder type to favor a continuity in the contact between the proton transport phase and the electron transport phase.

In turn, the proton transport phase is generally formed by the same material of the electrolyte membrane to favor, in this case, the continuity of such phase at the interface between the catalytic layer and the polyelectrolyte membrane. Once again, with regard to the catalyst, it should be said that the anode electrode and the cathode electrode are generally made with metals of a different nature. For the cathode electrode, the preferred catalytic metals are platinum and alloys of such metal with cobalt or chromium, while ruthenium, rhodium, iridium, palladium, platinum and their alloys are preferred for the anode electrode. Particularly in the case of the methanol fuel cells, the anode catalyst preferably comprises platinum or iridium alloys.

The electron transport phase, supporting the catalyst, is generally carbon-black (CB), and may contain organic groups on the surface, which favor their dispersion inside the polymer phase. The pore-forming agent can be any polymer which is soluble and/or removable via heat treatment (for example polysaccharides, polyethylene glycols etc.), or it can be a salt or a mixture of salts that can be removed via washing, like carbonates. As binder, polyolefins can be used, like polyethylene or polypropylene and other polymers like polyesters, polycarbonates, polyimides and the like.

As an electronically conductive load for PEMFC, the prior art has also provided the use of conductive polymers supporting the catalyst. The interest towards electronically conductive polymers arises from the higher conductivity which they have with respect to Carbon black (CB). The electronic conductivity of the Carbon black varies, for example, between $10^{-2}$ and $10^{-1}$ S/cm, while that of the conductive polymers can be up to $10^2$ S/cm.

Studies have also been conducted on catalytic activity confirming that, the catalyst used being the same, the capacity to activate the electrochemical reactions is increased when conductive polymers are used as supports. For example, the catalytic activity of the platinum dispersed on the polyaniline (PANI) towards the oxidation of the methanol is greater than that of the platinum dispersed on Carbon black, as is described in Akira Kitani, Tetsuro Akashi et al., "*Electrocatalytic oxidation of methanol on platinum modified polyaniline electrodes*" Synthetic Metals 121 (2001) 1301-1302.

Analogously, platinum particles dispersed on the polyaniline favor the oxygen reduction reaction more than the platinum supported on Carbon black does, as described for example in Evelyn K. W. Lai, et al., "*Electrocatalytic Reduction of Oxygen by Platinum Microparticles Deposited on Polyaniline Films*", Synthetic Metals 84 (1997), 87-88.

One study conducted on polyaniline moreover demonstrates that such polymer is capable of oxidizing the methanol even in the absence of catalyst, nevertheless in this case the power produced from the fuel cell is very low.

In any case, in each of the different studied conditions, it was shown that the increased catalytic activity permits reducing the quantity of catalyst, giving the same performance—the catalyst being a costly part in the making of the catalytic layer.

Generally, in the case of support such as Carbon black, the catalyst is deposited on the surface of the Carbon black either by chemical reduction or by electrodeposition, while if the electronically conductive phase comprises a polymer of the above-considered type, it is possible to incorporate the catalyst inside the polymer support.

In this second case, it is the entire three-dimensional structure of the polymer that acts as support for the catalyst, with consequent advantage of an increased overall catalytic capacity. The conductive polymers, in addition to the above-described advantages, can also improve the humidification conditions of the electrode due to the presence of different atoms along the chain, such as nitrogen (N), oxygen (O) and sulphur (S) atoms; this characteristic is enhanced in the case of conductive polymers which are sulfonates.

Improving the humidification of the electrode signifies reducing the electrical contact resistance, linked to the exchange of protons from the catalyst surface to the proton transport phase. In this manner, the loss of electrical power following such phenomenon is reduced, improving the efficiency of the entire fuel cell.

There is therefore a growing interest towards electronically conductive polymers supporting redox catalysts, in particular, for making catalytic layers of fuel cell electrodes, which can be an increasingly valid and improved alternative to the use of Carbon black.

SUMMARY OF THE INVENTION

One object of the present invention is to provide an electronically conductive polymer supporting at least one redox catalyst, here defined as electrocatalytic polymer, adapted to be used in making a catalytic layer, in particular in an electrode for fuel cells, which is capable for ensuring a high dispersion level of the catalyst inside the electronically conductive polymer matrix.

A further object is that of providing a polymer of the aforesaid type which is capable of providing an improved contact between the electron transport phase, the proton transport phase and the porous phase of the catalytic layer.

A further object is that of providing a method of production of a polymer of the aforesaid type alternative to the methods provided by the prior art.

These and other objects are achieved by an electrocatalytic polymer-based powder comprising particles of at least one electronically conductive polymer species in which particles are included of at least one catalytic redox species, which is characterised in that the aforesaid particles of the polymer species and the catalytic species are of nanometric dimension, the aforesaid electrocatalytic polymer-based powder being obtained through micellar synthesis.

With polymer species and catalytic species, it is intended, respectively, electronically conductive polymers such as polyaniline (PANI), polyacetylene, polythiophene, polypyrrole, poly-p-phenylene, polypyridine, their mixtures and copolymers, and metal redox catalysts such as platinum, palladium, ruthenium, rhodium, iridium, silver, nickel, iron, copper, cobalt, molybdenum, chromium, including their alloys, oxides and organic precursors.

Therefore, in the scope of certain embodiments, methods provide the synthesis of such electrocatalytic polymer-based powder in a micellar solution capable of dispersing the aforesaid catalytic species inside micelles, which form nanoreactors in which the polymerisation of the aforesaid polymer takes place. The aforesaid catalytic species then remains incorporated in the polymer-based powder.

Advantageously, in the electrocatalytic polymer-based powder thus obtained, the nanometric-dimension catalytic species is best dispersed and is also easily accessible to the reagents participatating in the electrochemical reactions at the electrodes of the fuel cells.

The aforesaid electrocatalytic polymer-based powder also comprises organic inclusions of nanometric dimension, such as carbon nanotubes. The methods involve the synthesis of such electrocatalytic polymer-based powder in a micellar solution capable of dispersing, inside micelles forming nanoreactors in which the polymerisation of the aforesaid polymer takes place, the carbon nanotubes and the aforesaid catalytic species, which then remain incorporated in the polymer-based powder.

In this case, the carbon nanotubes can also be previously loaded with the catalytic species, i.e. they can comprise, as inclusions, the particles of the catalytic species.

Advantageously, the polymer-based powder comprising the aforesaid carbon even allows improving the resistance to heat aging with respect to the prior art, which in conductive polymers has up to now represent one of the main limits of their application.

Heat aging in conductive polymers, in fact, lowers the electronic conductivity. Moreover, the presence of carbon nanotubes also improves the water resistance of the polymer-based powder, such contact being a further cause of the decrease over time of the polymer's electronic conductivity.

Advantageously, the aforesaid electrocatalytic polymer-based powder comprising carbon nanotubes, as described above, has instead an electronic conductivity nearly constant over time and is affected by the contact with water of polymer species to a lesser extent.

An aspect also provides a fuel cell of PEMFC type, in which at least one of the electrodes of the cell comprises a catalytic layer made with the aforesaid electrocatalytic polymer-based powder of nanometric dimension.

Further characteristics and advantages will be clear from the following description, and from several embodiments provided for illustrative and non-limiting purposes.

DETAILED DESCRIPTION OF THE PREFERRED EMBODIMENTS

Figure 1:
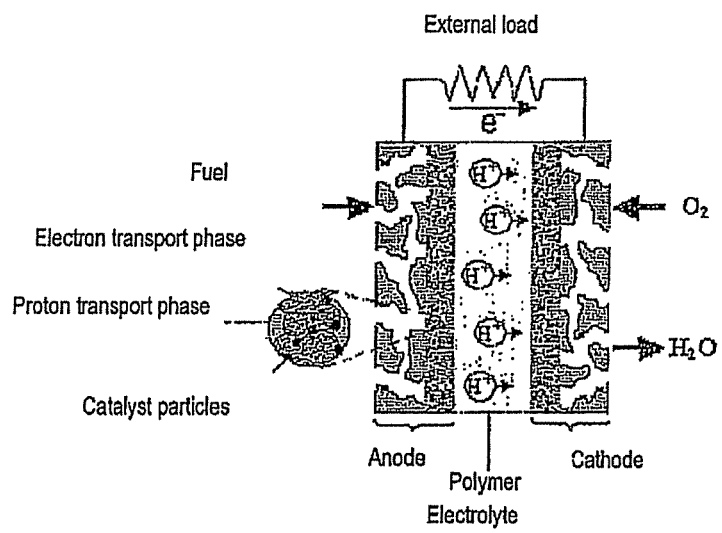
FIG. 1 is a schematic representation of an assembly of (MEA) components of a portion of a polymer electrolyte membrane fuel cell comprising two electrodes and an electrolyte membrane, in accordance with the prior art.

In accordance with the present invention, an electrocatalytic polymer-based powder of nanometric dimension is provided along with a related production method.

The term electrocatalytic is used to convey that the aforesaid powder is electronically conductive and has an overall catalytic activity, in particular regarding the redox reactions which generally occur in a fuel cell electrode.

In detail, the electrocatalytic polymer-based powder comprises particles of at least one electronically conductive polymer species having nanometric dimension, in which particles, that is, in which polymeric species, are included particles of at least one catalytic redox species, the latter also having nanometric dimension.

Suitable polymer species comprise all the electronically conductive organic polymers, including polyaniline (PANI), polyacetylene, polythiophene, polypyrrole, poly-p-phenylene, polypyridine, their mixtures and copolymers, doped in a known manner, for example, with hydrochloric acid, sulfonic acids, polymer acids or with the same starting monomer of the electronically conductive organic polymer (the polymer species) including an acid group or also with carbon nanotubes used as doping agents, or with mixtures of such agents.

A preferred polymer species comprises polyaniline (PANI) with nanometric dimensions comprised between 8 and 25 nm.

Regarding the catalytic species, it should be said that it comprises a metal with catalytic activity towards the electrode reactions, chosen in the group comprising platinum, palladium, ruthenium, rhodium, iridium, silver, nickel, iron, copper, cobalt, molybdenum, chromium, including their alloys, oxides and organic precursors.

In particular, platinum and platinum alloys with chromium and cobalt are preferred at the cathode; while in the case of methanol fuel cell, the anode catalyst is preferably a platinum and iridium alloy.

In addition, it should be observed that also ternary metal alloys can be used such as those of iron, nickel and cobalt, that is, economical metals, which have a catalytic activity similar to that of platinum on its own.

According to a preferred embodiment, the present electrocatalytic polymer-based powder also comprises organic inclusions of nanometric dimension, such as carbon nanotubes. In particular, carbon nanotubes are preferred whose conductivity is greater than or equal to $10^{-1}$ S/cm. The aforesaid carbon nanotubes can also be previously loaded with the catalyst, as will be clearer from the following description.

Regarding the production of the present electrocatalytic polymer-based powder, the method initially comprises a step of mixing in solution, in which at least one monomer of an electronically conductive polymer is mixed with predetermined quantities of at least one catalytic metal or with a compound comprising a catalytic metal (catalytic species), in the presence of at least one surface-active agent. Such mixing step is also carried out so as to obtain a micellar solution and thus through the use of a suitable amount of surface-active agent, at least equal to the critical micellar concentration.

In such micellar solution, the aforesaid monomer and the compound comprising the catalytic metal (or the metal itself) are dispersed inside micelles, each of which can therefore be assimilated to a nanoreactor, inside of which the polymer synthesis of the monomer takes place.

The step of polymer synthesis of the monomer determines the formation of the electronically conductive polymer, which as described can also be a copolymer, and which therefore was generically identified as a polymer species. Formed in the micelles, such polymer species is obtained in powder, in particular in particles of nanometric dimension.

In particular, during the aforesaid polymer synthesis reaction, particle aggregations may be prevented by the electrostatic repulsion interactions created between the anion groups of the micelles.

The nanometric electroconductive polymer particles, moreover, comprise inclusions that are also of nanometric dimension, i.e. the compound comprising the catalytic metal which remains incorporated inside the polymer-based powder. Such compound, in this case, is preferably a precursor of the metal itself, advantageously a thermolytic precursor. Among the thermolytic precursors, the mercaptides or thiolates are preferred, as will be clearer from the following description.

The obtained polymer-based powder is then precipitated, then filtered and possibly heated, obtaining the aforesaid electrocatalytic polymer-based powder. In particular, the heating of the filtered polymer powder is provided if the compound comprising the catalytic metal is a precursor of the above-considered type, which may be thermally decomposed for releasing the catalytic metal particles.

In particular, the precursor is decomposed via heat, and due to its optimal dispersion, gives rise to the formation of stable and uniformly distributed particles, with dimension of a few nanometers.

Thus, the possible heating step is carried out at a temperature which mainly depends on the type of precursor used and is capable of leading to the resolution of the precursor itself. The method can also comprise the step of washing the filtered electronically conductive polymer and a possible step of drying the washed polymer.

It should then be noted that the conductivity of an electronically conductive polymer can be modulated, within a wide range, as a function of the nature and amount of the doping agent used. Therefore, the electronically conductive polymer should be intended here as a polymer species comprising, that is, with already added, a predetermined quantity of a doping agent preferably chosen in the group including hydrochloric acid, sulfonic acids, polymer acids or the same starting monomer of the polymer used in the synthesis in case of self-doping agent, that is, which has an acid group on the molecule, or the doping agent can also be composed of carbon nanotubes, or by mixtures of such doping agents.

In particular, the doping agent is added in the aforesaid mixing step. It is also possible to employ mixtures of the aforesaid doping agents.

In the production of the electrolytic powders also comprising carbon nanotubes, the present method provides for the addition of the nanotubes in the aforesaid step of mixing with the monomer, the surface-active agent and the compound comprising the catalytic metal, or, in accordance with a further embodiment, the nanotubes are previously loaded with the compound comprising the catalytic metal.

In other words, the carbon nanotubes and the compound comprising the catalytic metal can be individually or jointly mixed.

In the latter case, the catalytic species is preferably a catalytic metal or an oxide thereof already included in the carbon nanotubes.

The nanotubes used can be single- or multiple-walled, provide they have a conductivity higher than that of Carbon Black, and thus greater than or equal to $10^{-1}$ S/cm. The quantity of carbon nanotubes with respect to that of the starting monomer is comprised between 0.1 and 50% by weight, and preferably is comprised between 1 and 20% by weight.

It should be noted, as stated above, that in the presence of nanotubes, it is the nanotubes themselves that act—possibly partially—as doping agent and that render the polymer species electronically conductive.

Therefore, the polymer-based powder in such case may or may not comprise, in addition to the nanotubes, further doping agents of the type described above, such as for example hydrochloric acid, sulfonic acids, polymer acids, the starting monomer of the electronically conductive polymer or their mixtures.

Regarding the catalyst, on the other hand, it should be said that there are no specific limitations to the quantity that can be used; in any case, the quantity of compound comprising the catalytic metal used is preferably such that the sum of catalytic metal resulting in the polymer-based powder is comprised between 0.1 and 80% by weight with respect to the weight of the starting monomer, more preferably comprised between 1 and 50%, and still more preferably comprised between 5 and 20%.

As previously described, as the catalytic species, it is possible to use various metals on their own or as alloy, and also their oxides or precursors such as the mercaptides of the metals themselves.

The mercaptides or thiolates of general formula (Me (SR) n) are particularly advantageous organometallic thermolytic precursors, since—contrary to other precursors of organic nature—they are stable at room temperature, even for prolonged periods of time. Their decomposition temperature generally is comprised between 100 and 250° C. and is therefore compatible with the heat stability of most polymers.

In any case, if the heat effect deteriorates the properties of the polymer species, it is possible to regenerate the same polymer species by means of a subsequent reacidification. To give rise to the formation of nanometric metal particles, nor can the possibility of using chemical reducers be excluded for the purpose of decomposing the precursor, which in such case may thus be chemically reactive.

If it is desired to obtain an electrocatalytic polymer-based powder comprising more than one catalytic species, it is sufficient, for example, to use organometallic precursors of the single metals in the desired composition. This permits incorporating the mercaptide precursor inside the polymer species and subsequently decomposing it via heat.

In addition, such precursors do not require controlled atmospheres in synthesis, storing and use step, and are generally not particularly toxic.

Regarding the starting monomer, it should be said that all monomers whose polymerisation leads to an electronically conductive polymer or copolymer (polymer species) may be used—and the preferred among these are aniline, acetylene, thiophene, pyrrole, phenyl, pyridine. In addition, it should be added that the electronically conductive polymer, to favor the humidification and/or integration conditions with the other components of a fuel cell electrode, can also have substituents of known type along the chain.

It should be observed that the electrocatalytic polymer-based powder, in particular in the variant comprising the nanotubes, for both above-considered cases (that is, nanotubes previously loaded with catalyst or nanotubes and catalyst precursor individually mixed with the surface-active agent), advantageously showed greater electronic conductivity than that of Carbon black loaded with a catalyst, a greater catalytic activity and a greater capacity to favour the humidification of the catalytic layer due to the presence of the conductor polymer.

The increase of the electronic conductivity is mainly due to the presence of the nanotubes. Such improvement was verified through the use of the electrocatalytic polymer-based powder in the making of the catalytic layer of an electrode of a fuel cell of the type considered above with reference to the prior art.

The total amount of electrocatalytic polymer used in an electrode depends on the thickness of the catalytic layer and it is comprised between 0.1 and 100 mg/cm$^2$.

In particular, to make the catalytic layer, the electrocatalytic polymer-based powder is first added to a binder solution, such as for example polyvinylidene fluoride, polytetrafluoroethylene and similar binders, so as to obtain a paste that can be deposited on the diffusive layer of the electrode and/or on the electrolytic membrane. Following the evaporation of the solvent, a proton transport polymer solution, such as for example Nafion®, can be applied to such layer and dried.

Alternatively, the electrocatalytic polymer-based powder can also be mixed directly with a proton-transport polymer solution, like Nafion®, together with other possible components such as binders and pore-forming agents, to make catalytic inks to apply on the diffusive layer of the electrode and/or on the electrolytic membrane.

In the case of direct mixing of the electrocatalytic polymer-based powder in the proton-transport polymer solution, there are two possibilities. The first includes grinding the electrocatalytic polymer-based powder following the aforesaid drying step of the same powder, and then after grinding disperse it in the proton-transport solution.

The second includes mixing the electrocatalytic polymer-based powder directly with the proton-transport solution, immediately after the washing step of the same electrocatalytic polymer-based powder.

This second possibility is advantageous, since the proton-transport polymer solutions often use alcohol solvents, for example ethanol, which are also used for washing the electrocatalytic polymer-based powder.

These methods are now illustrated in more detail though several non-limiting examples, in which the production is described of an electrocatalytic polymer-based powder of nanometric dimension and, as a partial production example, of an electronically conductive polymer-based powder of nanometric dimension comprising carbon nanotubes.

EXAMPLE 1 Production of a nanometric-dimension, electrocatalytic polymer-based powder of PANI doped with HCl and loaded to 10% by weight with platinum.

In a two-neck 500 ml flask, 100 ml of a 0.1 M HCl solution were introduced, in which 1.442 g of SDS and then 0.279 g of aniline were first dissolved.

Subsequently, 0.09 g of platinum thiolate was added, and after having purified the solution for 15 minutes with nitrogen, 10 ml was added drop-by-drop of 0.1 M HCl solution containing 0.342 g of APS.

The synthesis was carried out at a temperature of 23° C., under mechanical stirring for 12 hours.

The reaction mixture became dark green about a half hour after the insertion of the oxidiser, proof that the synthesis has occurred.

After the 12 hours of reaction, the polymer-based powder was precipitated by means of addition of excess methanol. The precipitate was filtered and washed twice with methanol, ethanol.

The powder, after having been dried at 40° C. under vacuum for 36 hours, was heat-treated around 200° C. so to cause the decomposition of the platinum precursor.

Figure 2:
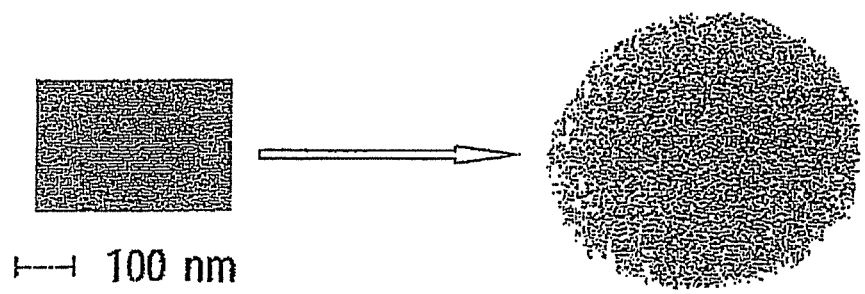
FIG. 2 illustrates a TEM image of a nanometric powder of an electronically conductive polymer (PANI) with a nanometric catalytic species (platinum particles) dispersed therein, according to the present invention.

In FIG. 2, the TEM image is reported of the PANI powder containing the dispersed catalyst, i.e. particles of dispersed platinum.

One can observe the nanometric dimension of the particles of the polymer-based powder, and also observe the presence of the metal nanoparticles of platinum at its interior.

The conductivity of the powder was equal to 2 S/cm.

EXAMPLE 2 A nanometric PANI powder doped with HCl was prepared and loaded to 10% by weight with multiple wall nanotubes (MWNT 10-30 nm, purity>80% Sun nanotech, electronic conductivity comprised between 1.4 and 10 S/cm).

In a 500 ml two-neck flask, 100 ml a 0.1 M HCl solution were introduced, in which 1.442 g of SDS and then 0.279 g of aniline were first dissolved.

Subsequently, 0.027 g of nanotubes were added to the synthesis solution, which was then purified for 15 minutes with nitrogen and sonicated for 10 minutes.

10 ml of 0.1 M HCl containing 0.342 g of APS was then added drop-by-drop.

The synthesis was carried out at a temperature of 23° C., under mechanical stirring for 12 hours.

The reaction mixture became dark green about a half hour after the insertion of the oxidiser, proving that the synthesis has occurred.

After the 12 hours of reaction, the polymer-based powder was precipitated by means of the addition of excess methanol. The precipitate was filtered and washed twice with methanol, ethanol.

The conductivity of the nanotubes used being comparable with that of the PANI powder without contact in water, the conductivity value of the composite powder thus obtained is directly reported, after an hour residence in water and subsequent drying at 40° C. under vacuum.

The conductivity value was $5.5 \times 10^{-1}$ S/cm, more than five times with respect to the powder without nanotubes held for the same time in water.

In addition, after a week of residence in water, the conductivity was about $10^{-1}$ S/cm against $5 \times 10^{-3}$ S/cm of the powder without nanotubes.

Therefore, one can assume that by improving the dispersion conditions of the nanotubes inside the PANI powder, it may be possible to identify the minimum amount of nanotubes so to optimise the stability of the conductivity value against the effect of water.

A similar discussion can be made for the stability of the conductivity towards the temperature. The advantages, which have already clearly emerged during the present description, mainly include the fact that an electrocatalytic polymer-based powder is provided which is particularly advantageous for making fuel cell catalytic layers—such powder comprising at least one electronically conductive polymer species of nanometric dimension in which nanometric particles are dispersed therein of at least one catalytic species.

In one such polymer-based powder, in fact, the catalyst is dispersed in the polymer support in an extremely effective manner, thus its consumption is optimised. In addition, the same catalyst is easily accessible to the reagents which participate in the electrochemical reactions, in this manner also optimising the performances of the fuel cell.

It is intended that a man skilled in the art can make numerous modifications with regard to the invention described above in its different embodiments, in order to satisfy particular and contingent needs. Such modifications are however all comprised in the scope of protection as defined by the following claims.

That which is claimed:

1. An electrocatalytic polymer-based powder comprising:
   a plurality of nanosized particles of at least one electrically conductive polymer species, said at least one electrically conductive polymer species comprising at least one of polyaniline, polyacetylene, polythiophene, polypyrrole, and poly-p-phenylene, polypyridine, and their mixtures and copolymers;
   a plurality of nanosized particles of at least one catalytic redox species mixed with said plurality of nanosized particles of at least one electrically conductive polymer species, with a weight of said at least one catalytic redox species comprising between 0.1 and 80% of a weight of said at least one electrically conductive polymer species; and
   a plurality of carbon nanotubes, with a weight of said carbon nanotubes comprising between 0.1% and 50% of a weight of said at least one electrically conductive polymer species;
   said at least one catalytic redox species being mixed with said plurality of carbon nanotubes.

2. An electrocatalytic polymer-based powder according to claim 1, wherein said electrically conductive polymer species has at least one dimension between 8 and 25 nm.

3. An electrocatalytic polymer-based powder according to claim 1, wherein said at least one catalytic redox species comprises at least one of platinum, palladium, ruthenium, rhodium, iridium, silver, nickel, iron, copper, cobalt, molybdenum, chromium, alloys, and oxides, and organic precursors thereof.

4. An electrocatalytic polymer-based powder according to claim 1, wherein a conductivity of said carbon nanotubes is at least $10^{-1}$ S/cm.

5. An electrocatalytic polymer-based powder according to claim 1, wherein a weight of said carbon nanotubes comprises between 1% and 20% of a weight of said at least one electrically conductive polymer species.

6. An electrocatalytic polymer-based powder according to claim 1, wherein a weight of said at least one catalytic redox species comprises between 1% and 50% of a weight of said at least one electrically conductive polymer species.

7. An electrocatalytic polymer-based powder according to claim 1, wherein a weight of said at least one catalytic redox species comprises between 5% and 20% of a weight of said at least one electrically conductive polymer species.

8. An electrocatalytic polymer-based powder according to claim 1, wherein said at least one electrically conductive polymer species is doped with a doping agent comprising at least one of hydrochloric acid, sulfonic acids, polymer acids, starting monomers of said polymer species including an acid group and mixtures thereof, and carbon nanotubes.

9. An electrocatalytic polymer-based powder comprising:
   a plurality of nanosized particles of at least one electrically conductive polymer species, said at least one electrically conductive polymer species comprising at least one of polyaniline, polyacetylene, polythiophene, polypyrrole, and poly-p-phenylene, polypyridine, and their mixtures and copolymers;
   a plurality of nanosized particles of at least one catalytic redox species mixed with said plurality of nanosized particles of at least one electrically conductive polymer species; and
   a plurality of carbon nanotubes, with a weight of said carbon nanotubes comprising between 0.1% and 50% of a weight of said at least one electrically conductive polymer species;
   said at least one catalytic redox species being mixed with said plurality of carbon nanotubes.

10. An electrocatalytic polymer-based powder according to claim 9, wherein said electrically conductive polymer species has at least one dimension between 8 and 25 nm.

11. An electrocatalytic polymer-based powder according to claim 9, wherein said at least one catalytic redox species comprises at least one of platinum, palladium, ruthenium, rhodium, iridium, silver, nickel, iron, copper, cobalt, molybdenum, chromium, alloys, and oxides, and organic precursors thereof.

12. An electrocatalytic polymer-based powder according to claim 9, wherein a conductivity of said carbon nanotubes is at least $10^{-1}$ S/cm.

13. An electrocatalytic polymer-based powder according to claim 9, wherein said at least one electrically conductive polymer species is doped with a doping agent comprising at least one of hydrochloric acid, sulfonic acids, polymer acids, starting monomers of said polymer species including an acid group and mixtures thereof, and carbon nanotubes.

14. An electrocatalytic polymer-based powder comprising:
   a plurality of nanosized particles of at least one electrically conductive polymer species, said at least one electrically conductive polymer species comprising at least one of polyaniline, polyacetylene, polythiophene, polypyrrole, and poly-p-phenylene, polypyridine, and their mixtures and copolymers;
   a plurality of nanosized particles of at least one catalytic redox species mixed with said plurality of nanosized particles of at least one electrically conductive polymer species, with a weight of said at least one catalytic redox species comprising between 0.1 and 80% of a weight of said at least one electrically conductive polymer species; and
   a plurality of carbon nanotubes;
   said at least one catalytic redox species being mixed with said plurality of carbon nanotubes.

15. An electrocatalytic polymer-based powder according to claim 14, wherein said electrically conductive polymer species has at least one dimension between 8 and 25 nm.

16. An electrocatalytic polymer-based powder according to claim 14, wherein said at least one catalytic redox species comprises at least one of platinum, palladium, ruthenium, rhodium, iridium, silver, nickel, iron, copper, cobalt, molybdenum, chromium, alloys, and oxides, and organic precursors thereof.

17. An electrocatalytic polymer-based powder according to claim 14, wherein a conductivity of said carbon nanotubes is at least $10^{-1}$ S/cm.

18. An electrocatalytic polymer-based powder according to claim 14, wherein said at least one electrically conductive polymer species is doped with a doping agent comprising at least one of hydrochloric acid, sulfonic acids, polymer acids, starting monomers of said polymer species including an acid group and mixtures thereof, and carbon nanotubes.

19. An electrocatalytic polymer-based powder according to claim 9, wherein a weight of said carbon nanotubes comprises between 1% and 20% of a weight of said at least one electrically conductive polymer species.

20. An electrocatalytic polymer-based powder according to claim 14, wherein a weight of said at least one catalytic redox species comprises between 1% and 50% of a weight of said at least one electrically conductive polymer species.

21. An electrocatalytic polymer-based powder according to claim 14, wherein a weight of said at least one catalytic redox species comprises between 5% and 20% of a weight of said at least one electrically conductive polymer species.

* * * * *